United States Patent [19]

Itoh et al.

[11] Patent Number: 4,676,601
[45] Date of Patent: Jun. 30, 1987

[54] DRIVE APPARATUS FOR A LIQUID CRYSTAL DAZZLE-FREE MIRROR ARRANGEMENT

[75] Inventors: Hiroshi Itoh, Oobu; Shinya Ohmi, Anjo; Yasutoshi Suzuki, Oobu; Tsuyoshi Fukada, Nagoya; Kunihiko Hara, Nukata, all of Japan

[73] Assignee: Nippondenso Co., Ltd., Kariya, Japan

[21] Appl. No.: 847,142

[22] Filed: Apr. 2, 1986

Related U.S. Application Data

[63] Continuation of Ser. No. 616,185, Jun. 1, 1984, abandoned.

[30] Foreign Application Priority Data

Nov. 14, 1983 [JP] Japan ................ 58-213626
Nov. 18, 1983 [JP] Japan ................ 58-218314

[51] Int. Cl.⁴ .................... G02F 1/13; G02B 17/00
[52] U.S. Cl. .................... 350/331 R; 350/278; 350/338
[58] Field of Search .......... 350/331 R, 338, 278–281, 350/283; 250/230

[56] References Cited

U.S. PATENT DOCUMENTS

| | | |
|---|---|---|
| 2,444,976 | 7/1948 | Brown . |
| 3,264,267 | 11/1962 | Collins ................ 350/1.6 |
| 3,542,455 | 11/1970 | Jensen . |
| 3,600,060 | 2/1968 | Churchill . |
| 3,601,614 | 8/1971 | Platzer . |
| 3,705,310 | 12/1972 | Wild . |
| 3,787,110 | 1/1974 | Berreman et al. . |
| 3,862,798 | 1/1975 | Hopkins . |
| 3,869,196 | 3/1975 | Kubota ................ 350/337 |
| 3,921,162 | 11/1975 | Fukai et al. . |
| 3,932,026 | 1/1976 | Spokel . |
| 3,944,331 | 3/1976 | Janning . |
| 3,961,181 | 6/1976 | Golden . |
| 3,976,875 | 8/1976 | Engstrom et al. ........... 350/311 X |
| 3,986,022 | 10/1976 | Hyatt . |
| 4,029,393 | 6/1977 | Dungan et al. . |
| 4,040,727 | 8/1977 | Ketchpel . |
| 4,095,217 | 6/1978 | Tani et al. . |

(List continued on next page.)

FOREIGN PATENT DOCUMENTS

| | | |
|---|---|---|
| 0111907 | 6/1984 | European Pat. Off. . |
| 2808260 | 8/1974 | Fed. Rep. of Germany ...... 350/278 |
| 2416172 | 10/1975 | Fed. Rep. of Germany ...... 350/278 |
| 2604462 | 11/1977 | Fed. Rep. of Germany . |
| 2732727 | 3/1978 | Fed. Rep. of Germany ... 350/331 R |
| 3041692 | 5/1981 | Fed. Rep. of Germany ...... 350/279 |
| 2111683 | 6/1972 | France . |
| 0040348 | 3/1977 | Japan . |
| 0039845 | 3/1980 | Japan . |
| 0004003 | 1/1982 | Japan . |
| 0102603 | 6/1982 | Japan . |
| 0490516 | 10/1937 | United Kingdom ................ 350/311 |
| 2029343 | 3/1980 | United Kingdom . |

Primary Examiner—John K. Corbin
Assistant Examiner—David Lewis
Attorney, Agent, or Firm—Cushman, Darby and Cushman

[57] ABSTRACT

A drive apparatus for a liquid crystal dazzlement preventing mirror arrangement for automatically setting a liquid crystal panel of the mirror arrangment to a dazzlement preventing state by detecting illuminance on the mirror surface and brightness in region near the mirror. An incident light detecting unit detects incident light onto the mirror. An ambient light detecting unit detects brightness in a region around mirror. A control unit receives both the incident light and the ambient light signals and produces a control signal for driving the liquid crystal panel through a drive unit. The apparatus includes an illuminance descrimination function, which is performed in such a manner that in the event of the illuminance on the mirror surface is higher than first prescribed set value of incident light illuminance and the illuminance in region around the mirror is lower than a prescribed set value of ambient light illuminance, the dazzlement preventing state is provided, and that in the event of the incident light illuminance is higher than a second prescribed set value of incident light illuminance which is higher than that of the first set value, irrespective of the ambient light illuminance, the dazzlement preventing state is also provided.

12 Claims, 10 Drawing Figures

U.S. PATENT DOCUMENTS

| | | |
|---|---|---|
| 4,161,653 | 7/1979 | Bedini et al. . |
| 4,200,361 | 4/1980 | Malvano . |
| 4,201,451 | 3/1980 | Jacob . |
| 4,202,607 | 5/1980 | Washizuka et al. . |
| 4,229,077 | 10/1980 | Schwab . |
| 4,266,859 | 5/1981 | Togashi . |
| 4,279,474 | 7/1981 | Belgorod . |
| 4,292,370 | 9/1981 | Pekko .................. 350/337 X |
| 4,342,030 | 7/1982 | Shanks . |
| 4,390,874 | 6/1983 | Woodside . |
| 4,408,837 | 10/1983 | Kozaki et al. . |
| 4,491,390 | 1/1985 | Tong-Shen . |
| 4,529,278 | 7/1985 | Nugget .................. 350/631 |
| 4,530,571 | 7/1985 | Connor .................. 350/629 |

DRIVE APPARATUS FOR A LIQUID CRYSTAL DAZZLE-FREE MIRROR ARRANGEMENT

This is a continuation of application Ser. No. 616,185, filed June 1, 1984, now abandoned.

RELATED APPLICATIONS

The subject matter of this application is related in general to the subject matter of the following applications: Ito et al, Ser. No. 593,946, filed Mar. 27, 1984, Itoh et al, Ser. No. 670,015, filed Nov. 9, 1984, Ohmi et al, Ser. No. 671,612, filed Nov. 15, 1984, and Itoh et al, (no serial number yet assigned) entitled "DRIVING APPARATUS FOR DAZZLE-FREE REFLECTION MIRRORS OF A VEHICLE", filed Feb. 13, 1985. These cases all relate in general to dazzle-free mirrors.

BACKGROUND OF THE INVENTION

The invention relates to reflecting mirror arrangements. More particularly, the invention provides a reflecting mirror arrangement of the dazzlement preventing type using a liquid crystal panel. A drive apparatus detects light incident to the reflecting mirror using a light sensor installed near the reflecting mirror and drives the liquid crystal panel to be made opaque when intensity of the incident light, for example, light rays from a head light of a succeeding vehicle, is greater than a prescribed value and thus provides the dazzlement preventing state to the reflecting mirror.

Known reflecting mirrors of the dazzlement preventing type have disadvantages in that even when ambient region is in ordinary brightness during daytime the light sensor detects the brightness and the drive apparatus operates to cause the reflecting mirror to operate in the dazzlement preventing state even though the user does not feel dazzlement. Therefore a switch for the drive apparatus must be turned off during daytime.

SUMMARY OF THE INVENTION

An object of the invention is to provide a drive apparatus for a reflecting mirror of the dazzlement preventing type using liquid crystal wherein when light rays from a headlight of a following car, from which one would feel dazzlement at night, are projected onto the reflecting mirror, the drive apparatus operates to put the reflecting mirror in the dazzlement preventing state and in case of the ordinary brightness of the light rays during daytime does not operate in the dazzlement preventing state.

A further object of the invention is to provide a drive apparatus for a reflecting mirror of the dazzlement preventing type using a liquid crystal which detects the intensity of the light rays and which, corresponding to the result of detection, even during daytime, operates the mirror in the dazzlement preventing state.

A related object of the invention is to provide a drive apparatus having a improved reflecting mirror, the glass surface of which is covered by a tansparent plastic film, so that even in case of strong impact force on, the glass is not broken away.

Briefly stated, in order to achieve the aforenoted objects, there is provided a drive apparatus for a reflecting mirror of the dazzlement preventing type using a liquid crystal. A liquid crystal panel is installed on a surface of the reflecting mirror is driven to change its optical properties. The drive apparatus comprises an incident light detecting unit for detecting incident light onto the reflecting mirror and outputting an incident light electrical signal indicative of illuminance of the incident light. Am ambient light detecting unit detects brightness around the reflecting mirror and produces an ambient light signal indicative of the illuminance around the reflecting mirror. A control unit receives both the incident light signal and ambient light signal and provides a control signal to drive the liquid crystal panel when the illuminance on the mirror surface caused by incident light is greater than a predetermined value and the illuminance around the mirror is less than a predetermined value of ambient light illuminance. A drive unit receives the control signal and applies an electric field between two electrodes of the liquid crystal panel in response to the control signal for driving the liquid crystal panel.

The invention will be better understood and further objects and advantages will become more apparent from the following detailed specification taken in conjunction with the accompanying drawings.

DESCRIPTION OF THE PREFERRED EMBODIMENT

Figure 1:
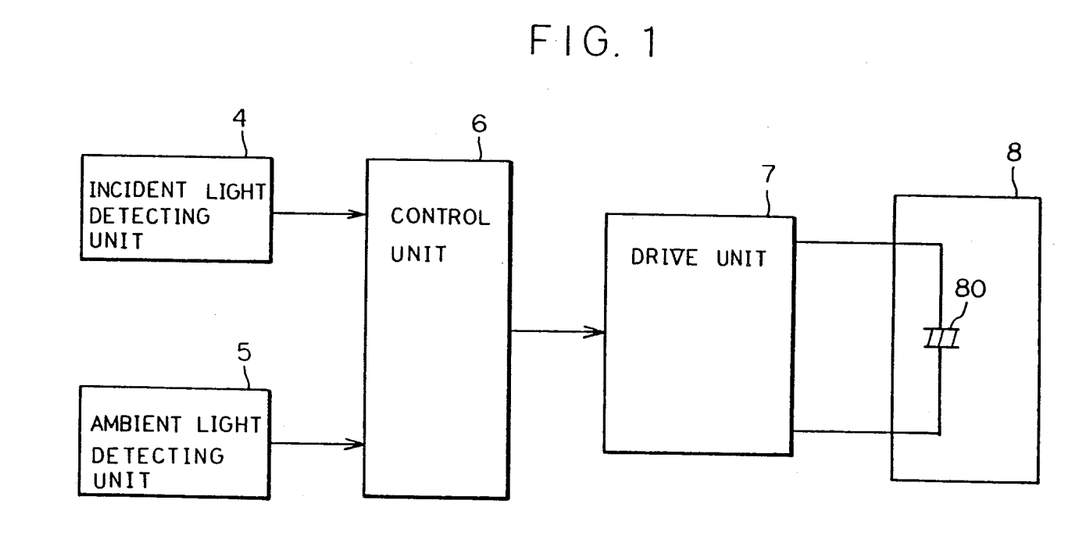
FIG. 1 is a block diagram of the invention.

Turning now to FIG. 1, there is shown a block diagram of the invention. In the preferred embodiment described herein, this invention is particularly applicable to the rear view mirror of an automobile. However, the invention is not limited to such use, but rather has more general application to other mirror arrangement wherever it is appreciate to present dazzlement. An incident light detecting unit 4 detects incident light projected onto the reflecting mirror from a front side thereof using a light sensor and produces an electrical incident light signal indicative of the illuminance (brightness) of that incident light. The front side of the reflecting mirror is the side of the mirror on which incident light impinges. Incident light, as used in herein, includes light rays from a headlight of a succeeding (following) vehicle or direct solar rays projected from the rear of an automobile. Any light sensor may be used as long as it can convert the incident light into an electric signal. For example, a photo-conductive cell or a photo-diode may be used for that purpose and located where desired to detect incident light to the reflecting mirror, e.g. lower portion at front side of the reflecting mirror.

An ambient light detecting unit 5 detects brightness in a region around the reflecting mirror and output illuminance in the ambient region and provides an electric ambient brightness signal indicative thereof. Illuminance in the ambient region means illuminance in a region near the reflecting mirror caused by light (ambient light) other than the incident light. For example, illuminance at near surface of the reflecting mirror corresponds to illuminance in the ambient region. The light sensor to detect illuminance of ambient light is positioned so as to not be affected by the incident light e.g. rear surface of the reflecting mirror. Otherwise, the light sensor may be installed within a space which is surrounded except for a lower portion thereof by a frosted glass or the like so as to minimize the influence of direct light rays from a headlight of an opposite vehicle or a succeeding vehicle.

A control unit 6 determines responsive to the incident and ambient light signals whether or not the incident light reflected at the reflecting mirror would cause a dazzling problem to a person and provides an output the control signal for driving the liquid crystal panel if the light is determined to be dazzling. That the light is determined to be dazzling means that incident light illuminance caused by the incident light is higher than a prescribed set value and ambient light illuminance caused by brightness in the ambient region is lower than a prescribed set value. This corresponds to the situation where light rays from a headlight of a succeeding vehicle are projected onto a room mirror of an automobile at night, for example. Furthermore, the control unit 6 may function to determine the dazzle of incident light regardless of ambient light when very bright incident light such as direct solar ray is projected. To attain this, the incident light illuminance set value may include a first set value and second set value higher than the first set value, and if the incident light illuminance is higher than the second set value the control signal may be outputted regardless of ambient light illuminance. The control unit 6 may be specifically implemented by a computer, AND gate, NAND gate and the like.

A drive unit 7 responsive to the control signal from control unit 6 applies an electric field between two electrodes of the liquid crystal panel for controlling the transparency of the liquid crystal panel.

A reflecting mirror 8 is controlled to operate in a dazzlement preventing state, as required, by the drive apparatus of the invention constitute as above described. The reflecting mirror unit 8 comprises a reflecting mirror and a liquid crystal panel installed on a surface of the reflecting mirror. The liquid crystal panel varies its transparency thereof corresponding to the drive signal. If the liquid crystal panel becomes opaque, intensity of reflected light from the reflecting miror decreases and the dazzlement preventing state is provided. The liquid crystal panel comprises at least two transparent electrodes of flat plane form and a liquid crystal interposed between the transparent electrodes.

Figure 2:
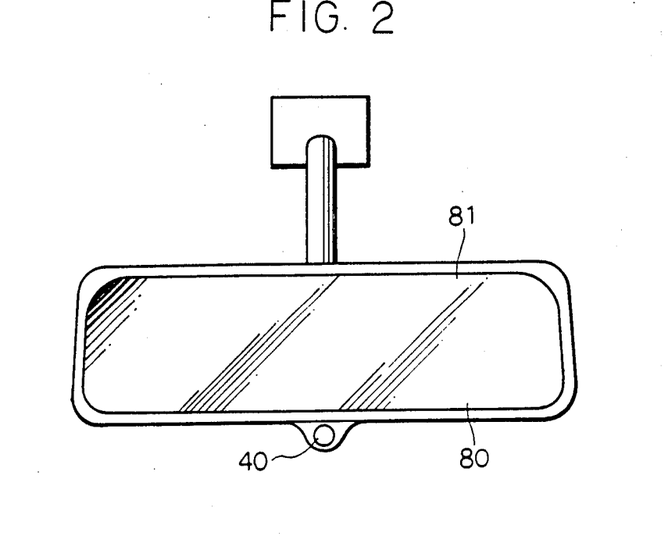
FIG. 2 is a front view of a reflecting mirror of the dazzlement preventing type driven by apparatus of a first embodiment of the invention.
Figure 3:
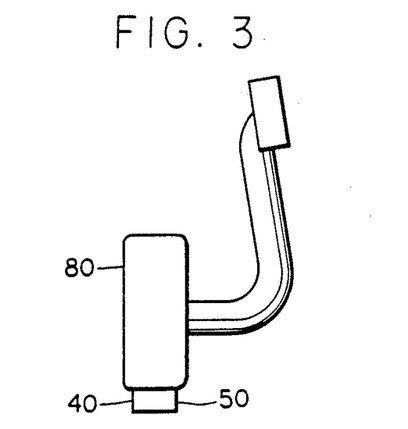
FIG. 3 is a side view of the mirror of FIG. 2.

A reflecting mirror of dazzlement preventing type with a liquid crystal driven by apparatus of a first embodiment is shown in FIGS. 2 and 3. There is a liquid crystal panel 8 installed over the entire surface of reflecting mirror 81. An incident light sensor 40 is installed on a lower portion at the front side of the reflecting mirror 81. An ambient light sensor 50 is installed on a lower portion at the rear side of the reflecting mirror 81.

Figure 4:
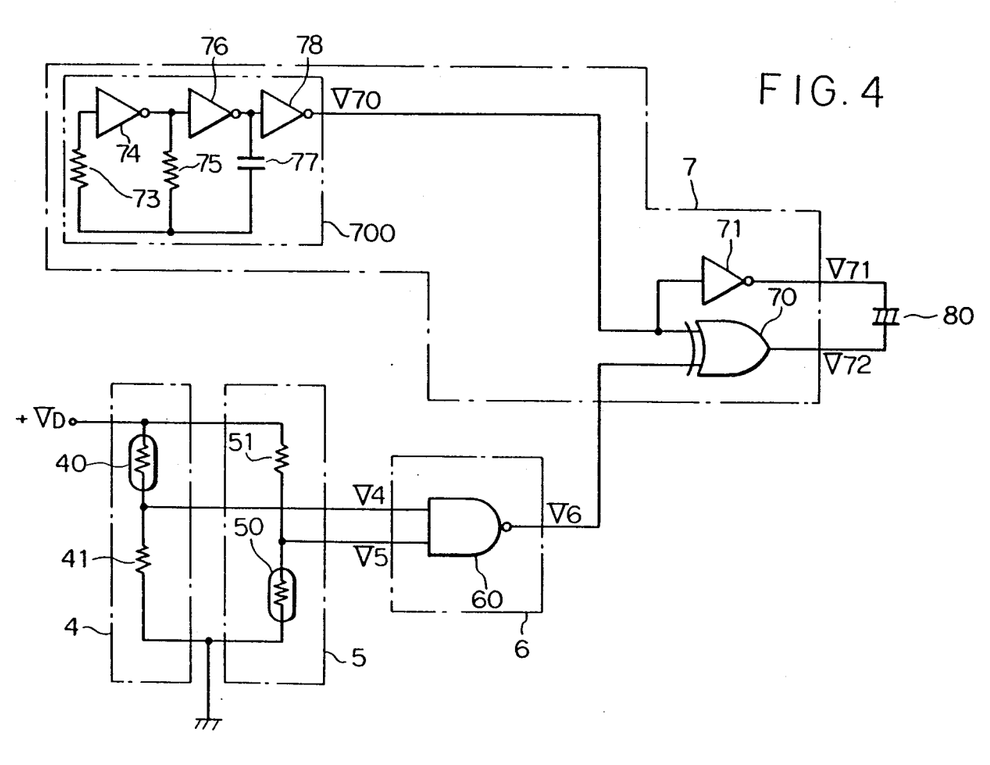
FIG. 4 is an electric circuit diagram of the apparatus of the first embodiment of the invention.

As seen in FIG. 4, an incident light detecting unit 4 is composed of a photo-conductive cell 40 and a resistor 41. It provides a voltage signal $V_4$ by dividing a voltage $V_D$ by the photo-conductive cell 40 and the resistor 41. Voltage $V_4$ is coupled to a first input of a NAND gate 60 of the control unit 6. An ambient light detecting unit 5 is composed of a resistor 51 and a photo-conductive cell 50. It provides a voltage signal $V_5$ by dividing the voltage $V_D$ by the resistor 51 and the photo-conductive cell 50. Voltage $V_5$ is coupled to a second input of NAND gate 60.

An output signal $V_6$ of NAND gate 60 is coupled to an exclusive-OR gate 70 of a drive unit 7. The drive unit 7 is composed of exclusive-OR gate 70, an inverter 71 and an oscillating circuit 700. The oscillating circuit 700 comprises resistors 73 and 75, inverters 74, 76, and 78, and a capacitor 77, which produces an output signal $V_{70}$ shown in FIG. 5 under the condition that the inverters 74, 76, and 78 are operative. The output signal $V_{70}$ of an oscillating circuit 700 is inputted to the exclusive-OR gate 70 and also the inverter 71. An output signal $V_{71}$ of the inverter 71 is then applied to one electrode of the liquid crystal panel 80, and an output signal $V_{72}$ of the exclusive-OR gate 70 to the other electrode of the liquid crystal panel 80.

Figure 5:
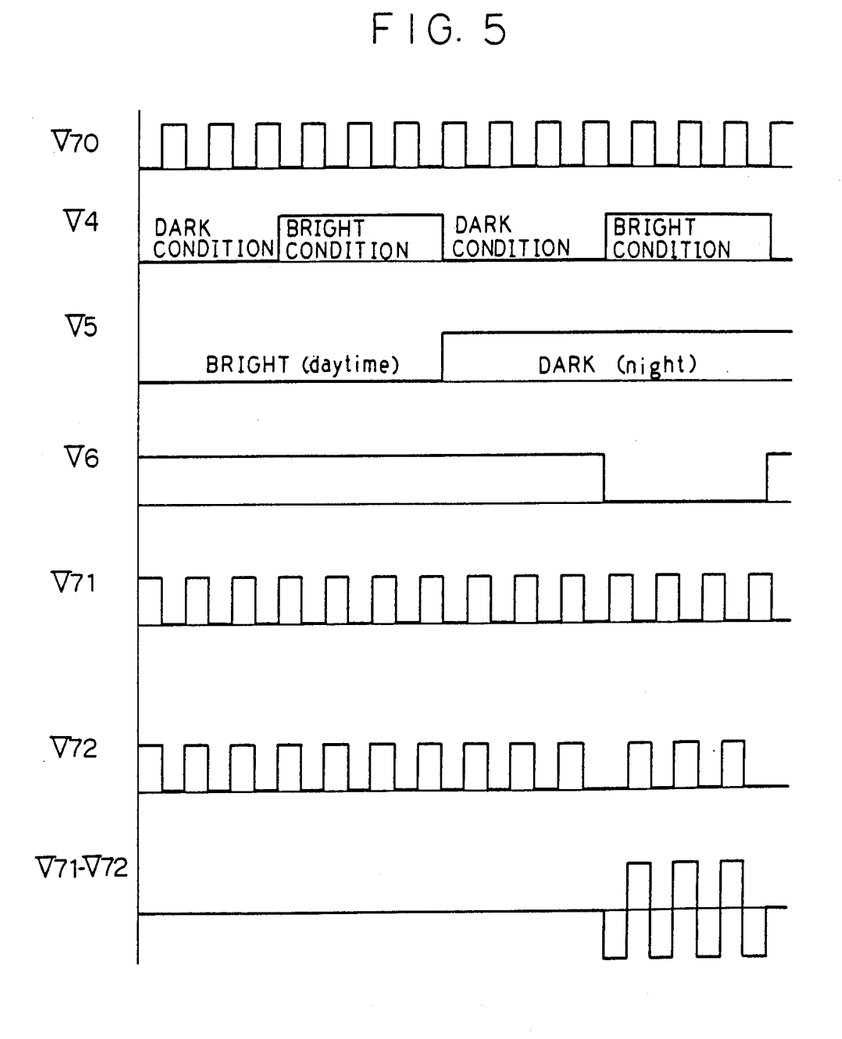
FIG. 5 is a timing chart illustrating the operation of the circuit shown in FIG. 4.

Turning now to FIG. 5, it is seen that output signal $V_4$ of the incident light detecting unit 4 becomes high level state during a bright condition, such as, for example when a room mirror is illuminated by a headlight of a succeeding vehicle. $V_4$ becomes a low level state during a dark condition, such as, for example when the room mirror is not illuminated. Output signal $V_5$ of the ambient light detecting unit 5 becomes a high level during a dark ambient condition, such as, for example at night. It becomes a low level during a bright ambient condition, such as, for example during daytime. Accordingly, output signal $V_6$ of the control unit 6 becomes a low level only when both $V_4$ and $V_5$ are at high levels. $V_6$ is inputted to the exclusive-OR gate 70, and output signal $V_{70}$ of the oscillating circuit 700 is also inputted to the exclusive-OR gate 70. Accordingly, output signal $V_{72}$ of the exclusive-OR gate 70 becomes reverse phase to $V_{71}$ ($V_{71}$ and $V_{70}$ being reverse phase) only when $V_6$ is at a low level state. Therefore a.c. electric field is applied to the liquid crystal panel 80 only when $V_6$ is in a low level state. That is, the liquid crystal panel 80 becomes opaque and the dazzlement preventing state is provided only when it is illuminated by the headlight of the succeeding vehicle at night.

Figure 6:
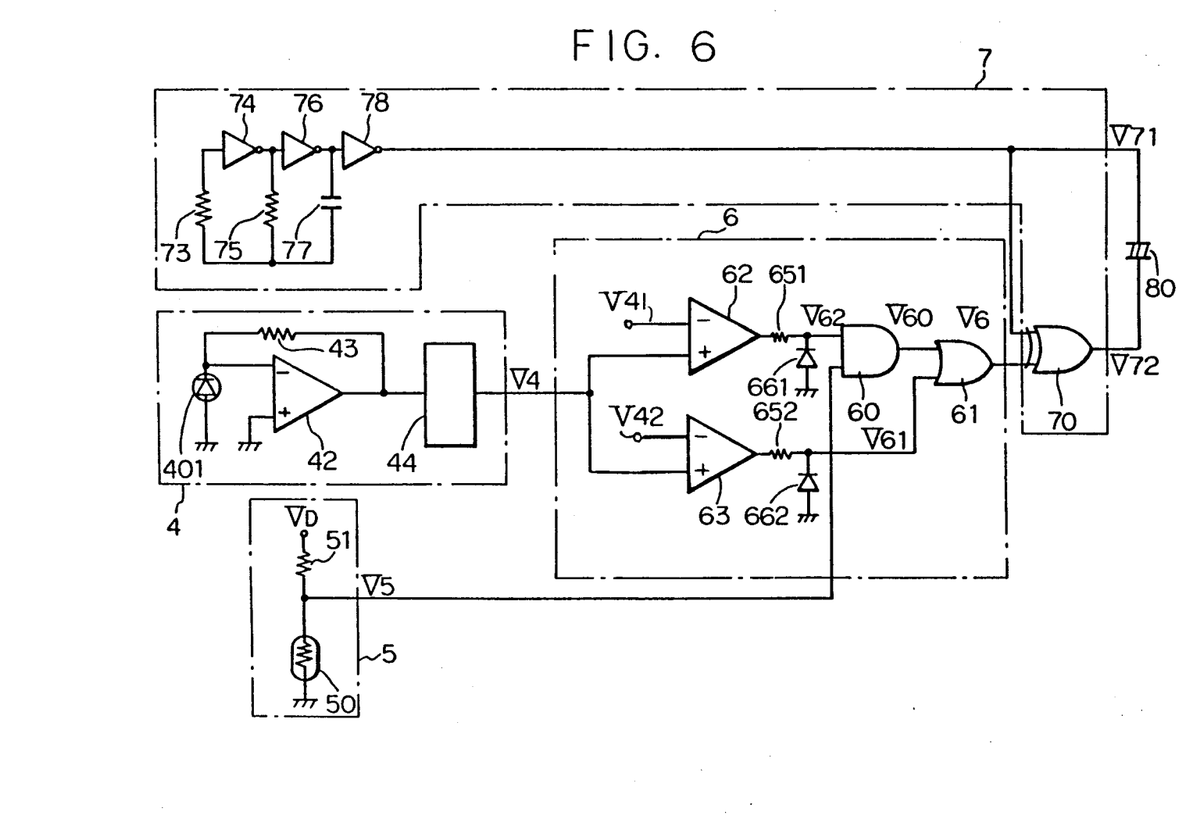
FIG. 6 is an electric circuit diagram of the apparatus of a second embodiment of the invention.
Figure 7:
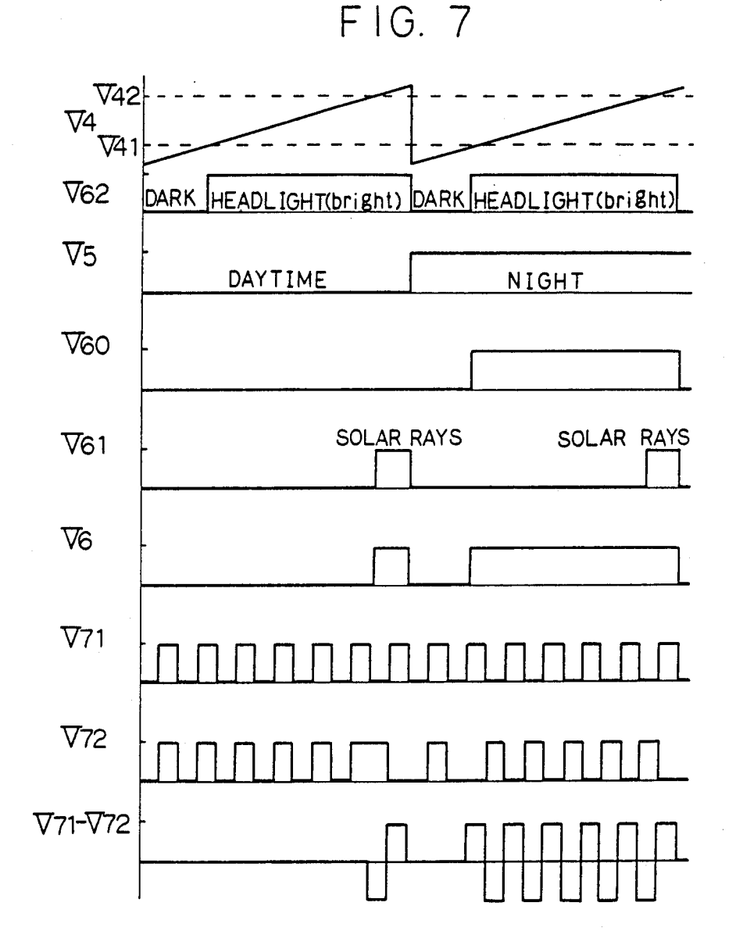
FIG. 7 is a timing chart illustrating the operation of the circuit shown in FIG. 6.

Referring now to FIGS. 6 and 7, there is shown a second embodiment of the invention. Since the external appearance of this embodiment of the reflecting mirror is similar to that of the reflecting mirror illustrated with respect to the first embodiment, a drawing thereof is omitted. It is assumed that not only light rays from a headlight of a succeeding vehicle but also direct solar rays are projected as incident light. When the direct solar rays are projected, the reflecting mirror is operated in the dazzlement preventing state.

An incident light detecting unit 4 comprises a photo diode 401 which is a light sensor, a resistor 43 and an operational amplifier 42 for converting an optical current of the photo diode 401 into a voltage signal, and a logarithmic amplifier 44. The resistor 43 determines the transfer function between current and voltage. Since the dynamic range of the incident light is wide, the logarithmic amplifier 44 performs the logarithmic conversion of the incident light into a linear charactertistic. Output signal $V_4$ of the incident light detecting unit 4 is coupled to noninventing input terminals of the comparators 62, 63. As shown in FIG. 7, the comparator 62 receives a threshold voltage $V_{41}$ and the comparator 63 receives a threshold voltage $V_{42}$. Accordingly, when the value of $V_4$ is higher than $V_{41}$, output signal $V_{62}$ of the comparator 62 becomes a high level. When the value of $V_4$ is higher than $V_{42}$, the output signal $V_{61}$ of the comparator 63 becomes a high level. The threshold voltage $V_{41}$ of the comparator 62 corresponds to a "first incident light illuminance set value". A value of $V_4$ higher than $V_{41}$ means that the reflecting mirror is illuminated by the headlight of the succeeding vehicle. The threshold voltage $V_{42}$ of the comparator 63 corresponds to a "second incident light illuinance set value". A value of $V_4$ higher than $V_{42}$ means that the direct solar rays are projected onto the reflecting mirror. Output signal $V_{62}$ of the comparator 62 is coupled through AND gate 60 to OR gate 61. Output signal $V_{61}$ of the comparator 63 is inputted directly to the OR gate 61. Output signal $V_6$ of the OR gate 61 is inputted as the output signal of the control unit 6 into exclusive-OR gate 70 of the drive unit 7. Output signal $V_5$ of the ambient light detecting unit 5 is inputted to the AND gate 60 in a similar manner to that of the first embodiment. A resistor 651 for current limiting and a diode 661 cause the input signal to AND gate 60 to be about 0 volts when the output of comparator 62 has changed from high level to low level. A resistor 652 and a diode 662 have the same function as the resistor 651 and the diode 661. Accordingly, an output signal $V_6$ of the control unit 6 becomes a high level when $V_5$ and $V_{62}$ are both high, i.e. when the room mirror is illuminated by the headlight of the succeeding vehicle at night. It also becomes a high level when $V_{61}$ is in high level, i.e. when the direct solar rays are projected onto the room mirror. Voltage signal $V_{72}$ applied to other electrode of the liquid crystal panel 80 becomes reverse phase to $V_{71}$ when $V_6$ is in high level. Accordingly, when $V_6$ is a high level, an a.c. electric field is applied to the liquid crystal panel 80 and the dazzlement preventing state is provided. In this embodiment, therefore, the room mirror is operated in the dazzlement preventing state when light rays from the headlight of the succeeding car are projected thereon at night. It also operates in the dazzlement preventing state regardless of the ambient light when the direct solar rays are projected in the daytime.

Figure 8:
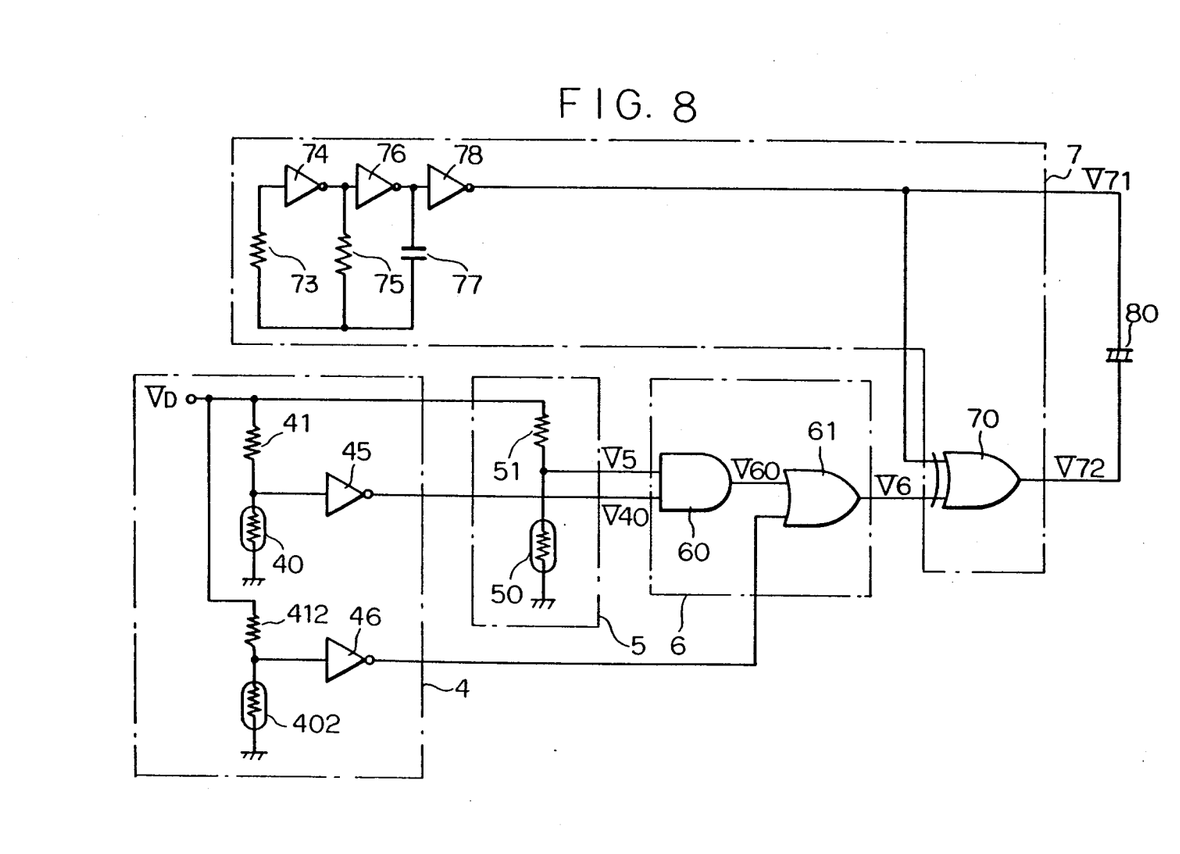
FIG. 8 is an electric circuit diagram of an apparatus of a third embodiment of the invention.
Figure 9:
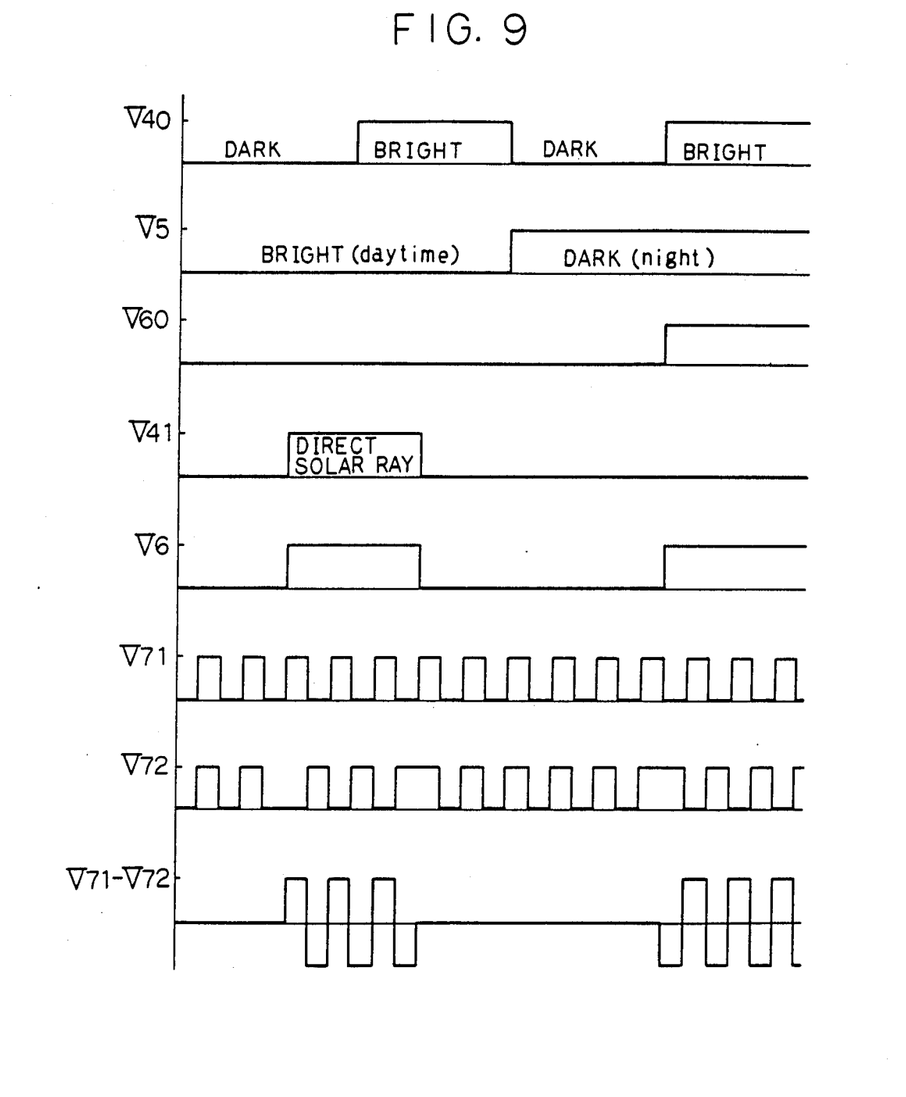
FIG. 9 is a timing chart illustrating the operation of the circuit shown in FIG. 8.

The operation of this embodiment as above described can be realized also by a circuit shown in Fig. 8. The circuit of FIG. 8 shows a modification of the previous embodiment wherein a light sensor to detect light rays of the headlight of the succeeding vehicle and a light sensor to detect the direct solar rays are formed separately. Light rays from the headlight of the succeeding vehicle are detected by a photo-conductive cell 40, and the direct solar rays are detected by a photo-conductive cell 402. A voltage established by dividing the voltage $V_D$ by a resistor 41 and the photo-conductive all 40 is input to an inverter 45. A voltage established by dividing the voltage $V_D$ by a resistor 412 and the photo-conductive cell 402 is input to an inverter 46. Therefore values of threshold voltage of 45 and 46 correspond to threshold voltage $V_{41}$, $V_{42}$ of $V_4$ in FIG. 6. FIG. 9 is a timing chart illustrating the operation of the circuit shown in FIG. 8. As seen from FIG. 9, the circuit of FIG. 8 also causes the room mirror to operate in the dazzlement preventing state when light rays from the headlight of the succeeding vehicle are projected thereon at night and when the direct solar rays are projected in the daytime.

Figure 10:
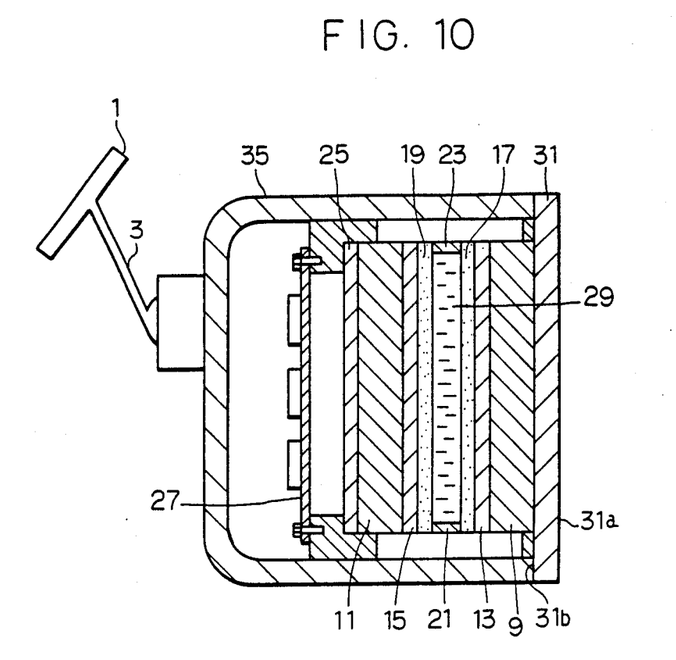
FIG. 10 is a detailed side view of the reflecting mirror shown in FIGS. 2, 3 as an embodiment of the present invention.

The reflecting mirror of FIGS. 2, 3 can be embodied in various ways. For example, FIG. 10 shows a sectional detail view illustrating a construction of a reflecting mirrors of dazzlement preventing type using liquid crystal as an embodiment of the invention. It comprises a mounting tool 1 for mounting a reflecting mirror, a link 3 extending from the mounting tool 1, and a reflecting mirror frame body 35 coupled to the link 3. The reflecting mirror frame body 35 has a U-shaped cross-section and a flat surface of approximately rectangular form. A reflecting mirror using liquid crystal element is arranged within the reflecting mirror frame body 35. The reflecting mirror has a pair of transparent glass substrates 9, 11 in parallel to each other. Transparent electrode films 13, 15 made of ITO (Indium-Tin-Oxide) are formed on inner end surface of the transparent glass substrates 9, 11 respectively. The glass substrates 9, 11 are held at a predetermined distance by spacers 21 and 23 so as to constitute a cell in parallel flat plane capacitor form. Polyamide is coated on the upper surface of the transparent electrode film 13 and 15, and rubbing treatment is performed ina definite direction to thereby form orientation films 17 and 19. A liquid crystal layer 29 is formed within the cell. The liquid crystal layer 29 may be an N-type nematic liquid crystal. The nematic liquid crystal comprises MBBA (N-(P-methoxybenzylibene)-P'-butylaniline). On the other end surface of the glass substrate 11 existing at rear surface of the liquid crystal element is vapor deposited aluminum film of thickness 500 A by means of sputtering thereby forming a reflecting film 25. A drive circuit 27 for applying voltage to the liquid crystal element is installed within the reflecting mirror frame body 35. A transparent plastic film 40 is provided on end surface at the light incident side of the transparent glass substrate 9. In the preferred embodiment, the transparent plastic film 31 comprises polyethylene film mixed with an ultraviolet absorbing agent of benzotriazole. The film thickness is about 0.5 mm. Since front surface of the transparent glass substrate 9 is covered by the transparent plastic film as above described, dispersion of glass pieces produced at breakage of the glass substrate 9 by inpact can be prevented by the elasticity of the transparent plastic film. Furthermore, deterioration of the liquid film by ultraviolet rays can be prevented on account of action of the ultraviolet absorbing agent mixed with the transparent plastic film 31.

Although the ultraviolet absorbing agent is mixed with the transparent plastic film in the embodiment, it may be coated on any of end surfaces 31a, 31b of the transparent plastic film.

According to the invention as above described, in a reflecting mirror of dazzlement preventing type using a liquid crystal, illuminance on the mirror surface caused by incident light projected onto the reflecting mirror from front side thereof and brightness in region near the reflecting mirror are set as criterion to drive a light sensor when the liquid crystal panel is driven. The liquid crystal panel is driven corresponding to relation of illumination and the dazzlement preventing state is provided. As clearly seen from embodiments, the invention suppresses the dazzlement preventing state of the reflecting mirror when ambient region is bright in the daytime and therefore one does not feel dazzling. On the contrary, the dazzlement preventing state is provided when the mirror is illuminated by a headlight of a succeeding vehicle at night. Accordingly, a special manual switch operation is not required.

Further in the preferred embodiment of the invention, since the surface of the glass substrate disposed at light incidence side is covered by a transparent plastic film, and even if a strong impact force is applied to the reflecting mirror and the glass is broken, the glass is not dispersed away because of the elasticity of the covering of plastic film.

What is claimed is:

1. A dazzlement preventing mirror arrangement for a vehicle comprising:
   a rear view mirror assembly mounted on said vehicle and operable in either a dazzlement-preventing state or in a dazzlement non-preventing state;
   rear light detecting means for detecting rear light incident to said rear view mirror assembly from the rear of said vehicle and providing a first electrical signal indicative of the detected rear light;
   discriminating means for determining an ambient light condition in a region of said rear view mirror assembly and providing a second electrical signal indicative thereof,
   dazzle control means, responsive to said first and second electrical signals, for (1) causing said rear view mirror assembly to operate in said dazzlement preventing state when both said detected rear light is higher than a first predetermined level and said ambient light condition meets first predetermined criteria and (2) causing said rear view mirror assembly to operate in said dazzlement preventing state when said detected rear light is higher than a second predetermined level which is higher than said first predetermined level regardless of said ambient light condition.

2. An arrangement according to claim 1 wherein said dazzle control means comprises: control means, responsive to said first and second electrical signals, for generating a control signal and drive means, responsive to said control signal, for controlling the dazzlement or non-dazzlement state of said mirror assembly.

3. An arrangement according to claim 1 wherein said ambient light condition discriminating means comprises ambient light detecting means for detecting an ambient light level and providing said second electrical signal indicative thereof.

4. An arrangement according to claim 2 wherein said rear view mirror assembly comprises a liquid crystal panel, said dazzle control means driving said liquid crystal panel to reduce the transmittivity thereof in response to said control signal.

5. An arrangement according to claim 3 wherein said ambient light detecting means is mounted on said rear view mirror assembly at a position substantially insensitive to light incident from the rear of said vehicle.

6. A dazzlement preventing mirror arrangement for a vehicle comprising:
   a rear view mirror assembly mounted on said vehicle and operable in either a dazzlement-preventing state or in a dazzlement non-preventing state;
   rear light detecting means for detecting rear light incident to said rear view mirror assembly from the rear of said vehicle and providing a first electrical signal indicative thereof;
   ambient light condition discriminating means for determining an ambient light condition in a region of said rear view mirror and providing a second electrical signal indicative thereof;
   first comparing means for comparing said first electrical signal indicative of rear light with a first predetermined level and providing a first output when said detected rear light is higher than said first predetermined level;
   second comparing means for comparing said first electrical signal indicative of detected rear light with a second predetermined level higher than said first predetermined level and providing a second output when said detected rear light is higher than said second predetermined level;
   logic means, responsive to said first output and said second electrical signal, for providing a third output when said first output is provided and, at the same time, said ambient light condition indicated by said second electrical signal meets predetermined criteria; and
   drive means for driving said rear view mirror assembly into said dazzlement-preventing sate in response to said second output or in response to said third output.

7. An arrangement according to claim 6 wherein said rear view mirror assembly comprises a liquid crystal panel, said drive means driving said liquid crystal panel to reduce the transmittivity thereof in response to said control signal.

8. An arrangement according to claim 6 wherein said ambient light condition discriminating means comprises ambient light detecting means for detecting an ambient light level and providing said second electrical signal indicative thereof.

9. An arrangement according to claim 8 wherein said ambient light detecting means is mounted on said rear view mirror assembly at a position insensitive to light incident from the rear of said vehicle.

10. A dazzlement preventing mirror arrangement for a vehicle comprising:
   a rear view mirror assembly mounted on said vehicle and operable in either a dazzlement-preventing state or in a dazzlement non-preventing state;
   first light detecting means for detecting rear light incident to said rear view mirror assembly from the rear of said vehicle and providing a first output indicating that the detected rear light is higher than a first reference level predetermined to discriminate whether or not said rear light corresponds to intensive headlight from a following vehicle;
   second light detecting means for detecting rear light incident to said rear view mirror assembly from the rear of said vehicle and providing a second output indicating that the detected rear light is higher than a second reference level higher than said first reference level predetermined to discriminate whether or not said rear light corresponds to sunlight directly incident to said rear view mirror assembly;
   ambient light detecting means for detecting ambient light and providing a third output indicating that ambient light is lower than a third reference level predetermined to discriminate day and night;
   control means, responsive to said first, second and third outputs, for (1) providing a control output in response to the simultaneous occurrence of both said first output and said third output and (2) providing a control output in response to said second output regardless of the others; and drive means for driving said rear view mirror assembly into said dazzlement-prevening state in response to said control signal.

11. An arrangement according to claim 10 wherein said rear view mirror assembly comprises a liquid crystal panel, said drive means driving said liquid crystal panel to reduce the transmittivity thereof in response to said control signal.

12. An arrangement according to claim 10 wherein said ambient light detecting means is mounted on said rear view mirror assembly at a position insensitive to light incident from the rear of said vehicle.

* * * * *